(12) United States Patent
Zhang et al.

(10) Patent No.: US 11,219,980 B2
(45) Date of Patent: Jan. 11, 2022

(54) ANGLE GRINDER AND MOTOR THEREOF

(71) Applicant: Nanjing Chervon Industry Co., Ltd., Nanjing (CN)

(72) Inventors: Cheng Zhang, Nanjing (CN); Chungui Zou, Nanjing (CN); Guoliang Shi, Nanjing (CN); Junmin Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 339 days.

(21) Appl. No.: 16/653,024

(22) Filed: Oct. 15, 2019

(65) Prior Publication Data

US 2020/0130128 A1 Apr. 30, 2020

(30) Foreign Application Priority Data

Oct. 29, 2018 (CN) .......................... 201821765826.7
Sep. 19, 2019 (CN) .......................... 201910888586.2

(51) Int. Cl.
  *B24B 23/02* (2006.01)
  *H02K 7/14* (2006.01)
  *H02K 5/14* (2006.01)
  *B24B 47/12* (2006.01)

(52) U.S. Cl.
  CPC ............ *B24B 23/028* (2013.01); *B24B 47/12* (2013.01); *H02K 5/148* (2013.01); *H02K 7/145* (2013.01)

(58) Field of Classification Search
  CPC ....... B24B 23/02; B24B 47/12; B24B 23/028; H02K 5/14; H02K 7/14; H02K 5/148; H02K 13/006; H02K 7/145; H02K 2213/03; H01R 39/04
  See application file for complete search history.

(56) References Cited

U.S. PATENT DOCUMENTS

| 2011/0012446 A1* | 1/2011 | Maute | H02K 5/143 |
| | | | 310/50 |
| 2013/0313924 A1* | 11/2013 | Nace | H02K 3/345 |
| | | | 310/50 |
| 2014/0070660 A1* | 3/2014 | Lau | H01R 43/06 |
| | | | 310/235 |
| 2018/0319002 A1* | 11/2018 | Esenwein | H02K 5/20 |

* cited by examiner

*Primary Examiner* — Naishadh N Desai
(74) *Attorney, Agent, or Firm* — Greenberg Traurig, LLP

(57) ABSTRACT

An angle grinder includes a housing, an output shaft, and a motor. The motor includes a stator assembly, a rotor assembly including a motor shaft configured to rotate about a first axis, a commutator, and a carbon brush. The commutator includes a bushing, configured to connect the commutator to the motor shaft, a plurality of commutator segments, sequentially distributed in a circumferential direction around the first axis and arranged around the bushing, and an insulating member, configured to bond the bushing and the plurality of commutator segments so as to constitute a whole.

20 Claims, 9 Drawing Sheets

ANGLE GRINDER AND MOTOR THEREOF

RELATED APPLICATION INFORMATION

This application claims the benefit under 35 U.S.C. § 119(a) of Chinese Patent Application No. CN 201821765826.7, filed on Oct. 29, 2018, and Chinese Patent Application No. CN 201910888586.2, filed on Sep. 19, 2019, the disclosures of which are incorporated herein by reference in their entirety.

TECHNICAL FIELD

The present disclosure relates to a power tool, particularly, to an angle grinder and a motor thereof.

BACKGROUND

As a power tool with a relative large output power, a motor used by the angle grinder generally adopts a series motor with high power and a high rotating speed. A commutator is one of the important components of the series motor with the high power and the strength and performance of the commutator are very important to the stable operation of the motor. When the motor operates at the high rotating speed, the commutator needs to bear a huge centrifugal force generated when the motor rotates. Otherwise, due to the centrifugal force, the commutator bar would bounce in a radial direction to change a position, or be disengaged from a base portion of the commutator.

SUMMARY

In one described example of an angle grinder, the angle grinder includes a housing; an output shaft at least partially extending out of the housing; and a motor configured to drive the output shaft to output power; wherein the motor includes a stator assembly; a rotor assembly comprising a motor shaft configured to rotate about a first axis; a commutator connected to the motor shaft; and a carbon brush in contact with the commutator; wherein the commutator includes a bushing configured to connect the commutator to the motor shaft; a plurality of commutator segments sequentially distributed in a circumferential direction around the first axis and arranged around the bushing; and an insulating member configured to bond the bushing and the plurality of commutator segments so as to constitute a whole; wherein each of the commutator segments includes a contact portion configured to contact the carbon brush; a bonding portion configured to bond a respective commutator segment to the insulating member; and a connecting portion configured to connect the contact portion with the bonding portion; wherein the contact portion and the bonding portion are arranged at intervals in a radial direction perpendicular to the first axis; a difference between a length of the contact portion along a direction parallel to the first axis and a length of the bonding portion in a direction parallel to the first axis is greater than or equal to 0 mm and less than 2 mm.

In one described example of the angle grinder, the difference between the length of the contact portion along the direction parallel to the first axis and the length of the bonding portion along the direction parallel to the first axis is greater than or equal to 0 mm and less than or equal to 1 mm.

In one described example of the angle grinder, the difference between the length of the contact portion along the direction parallel to the first axis and the length of the bonding portion along the direction parallel to the first axis is greater than or equal to 0 mm and less than or equal to 0.5 mm.

In one described example of the angle grinder, in the direction parallel to the first axis, the bonding portion comprises a first end and a second end arranged at two ends of the bonding portion, the contact portion comprises a third end and a fourth end arranged at two ends of the contact portion; the first end is aligned with the third end, and the second end is aligned with the fourth end.

In one described example of the angle grinder, the bonding portion is continuous from the first end to the second end and the contact portion is continuous from the third end to the fourth end.

In one described example of the angle grinder, two connecting portions are provided, an accommodating hole is formed between the two connecting portions, and a part of the insulating member is embedded into the accommodating hole.

In one described example of the angle grinder, a length of the accommodating hole along a direction parallel to the first axis is greater than or equal to 2.8 mm and less than or equal to 3.3 mm.

In one described example of the angle grinder, a first accommodating groove and a second accommodating groove are arranged between the bonding portion and the contact portion, the two connecting portions are defined as a first connecting portion and a second connecting portion respectively, the first connecting portion is arranged between the first accommodating groove and the accommodating hole, and the second connecting portion is arranged between the accommodating hole and the second accommodating groove, the commutator further comprises a first reinforcing ring at least a part of which is arranged inside the first accommodating groove and a second reinforcing ring at least part of which is arranged inside the second accommodating groove, the first reinforcing ring surrounds the bonding portion around the first axis, and the second reinforcing ring surrounds the bonding portion around the first axis.

In one described example of the angle grinder, the bonding portion comprises a first supporting surface configured to contact the first reinforcing ring, and a length of the first supporting surface along a direction parallel to the first axis is greater than or equal to 2.5 mm and less than or equal to 3.5 mm.

In one described example of the angle grinder, the first connecting portion comprises a first connecting surface and a second connecting surface, the first connecting surface constitutes a groove bottom of the first accommodating groove, and the second connecting surface constitutes a hole wall of the accommodating hole; the first connecting surface extends in a first plane obliquely intersected with the first axis.

In one described example of the angle grinder, the first supporting surface extends in a second plane, the second plane and the first axis are parallel to each other, and an angle formed by intersection of the second plane and the first plane is greater than or equal to 75 degrees and less than or equal to 85 degrees.

In one described example of the angle grinder, two side walls of the bonding portion in the circumferential direction around the first axis are defined as a first side wall and a second side wall respectively, the first side wall is formed with a first recess recessed towards the second side wall, and the second side wall is formed with a second recess recessed towards the first side wall, a part of the insulating member is embedded into the first recess, and another part of the insulating member is embedded into the second recess.

In one described example of the angle grinder, the bonding portion extends along a first straight line parallel to the first axis, and the contact portion extends along a second straight line parallel to the first axis; the second straight line and the first straight line are parallel to each other.

In one described example of a motor, the motor includes a stator assembly; a rotor assembly comprising a motor shaft configured to rotate about a first axis; a commutator connected to the motor shaft; and a carbon brush in contact with the commutator; wherein the commutator includes a bushing configured to connect the commutator to the motor shaft; a plurality of commutator segments sequentially distributed in a circumferential direction around the first axis and arranged around the bushing; and an insulating member configured to bond the bushing and the plurality of commutator segments so as to constitute a whole; wherein each of the commutator segments includes a contact portion configured to contact the carbon brush; a bonding portion configured to bond a respective commutator segment to the insulating member; and a connecting portion, configured to connect the contact portion with the bonding portion; wherein the contact portion and the bonding portion are arranged at intervals along a radial direction perpendicular to the first axis; a difference between a length of the contact portion along a direction parallel to the first axis and a length of the bonding portion in a direction parallel to the first axis is greater than or equal to 0 mm, and less than 2 mm.

In one described example of the motor, the difference between the length of the contact portion along the direction parallel to the first axis and the length of the bonding portion along the direction parallel to the first axis is greater than or equal to 0 mm and less than or equal to 0.5 mm.

In one described example of the motor, two side walls of the bonding portion in the circumferential direction around the first axis are defined as a first side wall and a second side wall respectively, the first side wall is formed with a first recess recessed towards the second side wall, and the second side wall is formed with a second recess recessed towards the first side wall, a part of the insulating member is embedded into the first recess, and another part of the insulating member is embedded into the second recess.

In one described example of the motor, the bonding portion extends along a first straight line parallel to the first axis, and the contact portion extends along a second straight line parallel to the first axis; the second straight line and the first straight line are parallel to each other.

In one described example of the motor, in the direction parallel to the first axis, the bonding portion comprises a first end and a second end arranged at two ends of the bonding portion, the contact portion comprises a third end and a fourth end arranged at two ends of the contact portion; the first end is aligned with the third end, the second end is aligned with the fourth end, the bonding portion is continuous from the first end to the second end, and the contact portion is continuous from the third end to the fourth end.

In one described example of the motor, two connecting portions are provided, an accommodating hole is formed between the two connecting portions, and a part of the insulating member is embedded into the accommodating hole.

In one described example of the motor, the two connecting portions are defined as a first connecting portion and a second connecting portion respectively, two side walls of the first connecting portion in the circumferential direction around the first axis are defined as a three side wall and a four side wall respectively, and both the third side wall and the fourth side wall are provided with protrusions.

DETAILED DESCRIPTION

Figure 1:
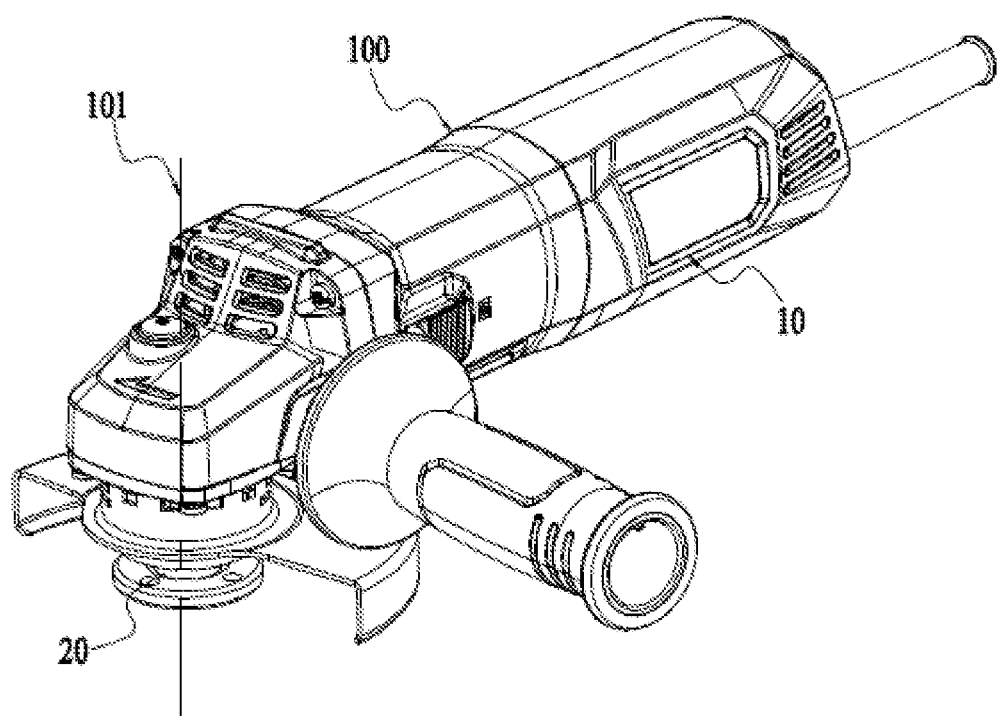
FIG. 1 is a perspective view illustrating an angle grinder according to one example of the present disclosure.
Figure 2:
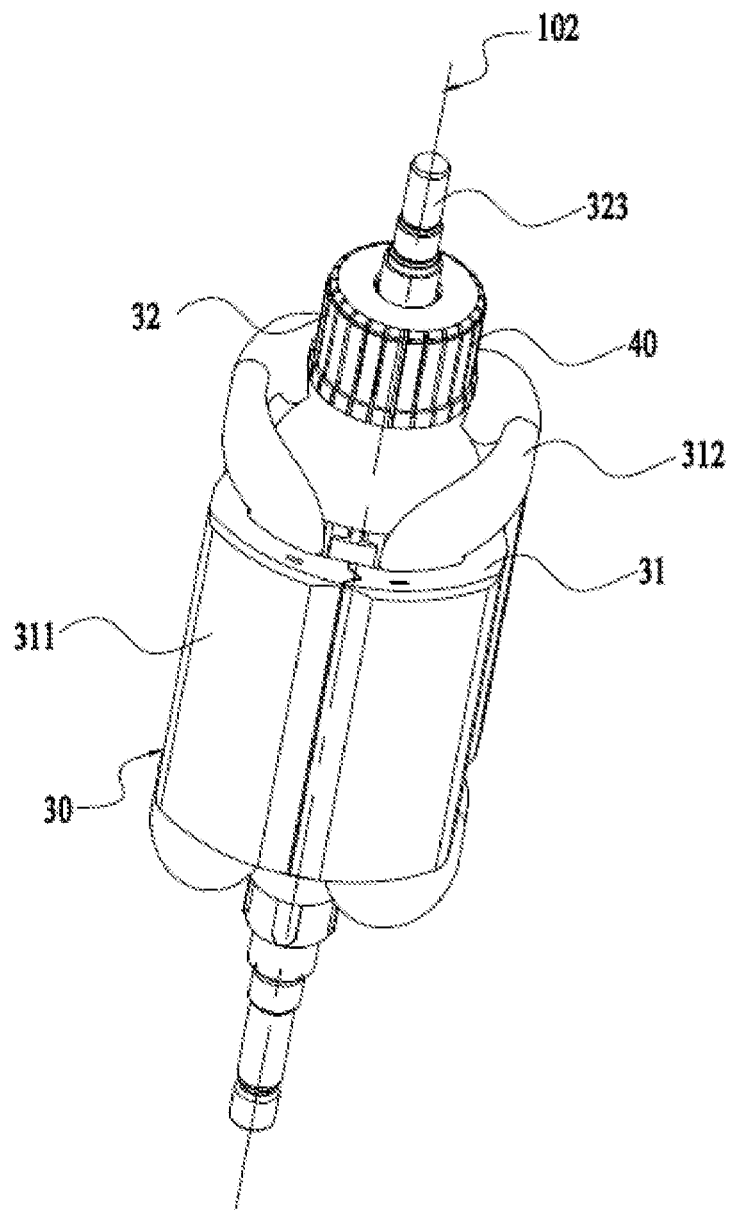
FIG. 2 is a perspective view illustrating a motor of the angle grinder in FIG. 1.

A power tool shown in FIG. 1 is specifically an angle grinder 100 capable of performing grinding or cutting operations on a workpiece when a grinding disc is installed. As shown in FIG. 1 and FIG. 2, the angle grinder 100 includes a housing 10, an output shaft 20 and a motor 30. For other types of power tools except for the angle grinder, the power tools may include some types of output members such that the motor can drive the output members to output power. The power tool may be a sanding-type power tool, such as a sander an output member of which may be a bottom plate. The power tool may also be a torque output type power tool, such as an electric drill, a screwdriver, and a wrench. The power tool may also be a gardening-type power tool, such as a blower, a pruner, and a grass trimmer.

The housing 10 of the angle grinder 100 substantially extends along a straight line. The housing 10 is formed with a handle for being gripped by a user.

Figure 3:
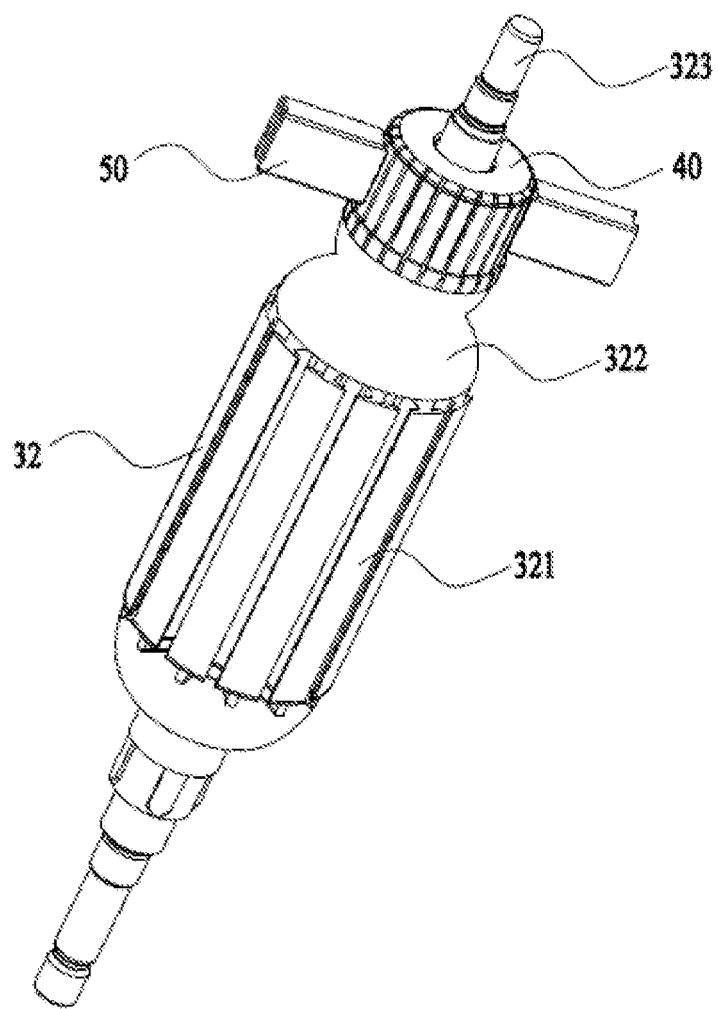
FIG. 3 is a perspective view illustrating a rotor assembly of the motor in FIG. 2 installed with a carbon brush.

At least a part of the output shaft 20 extends out of the housing 10. The output shaft 20 is rotatable about a second axial line 101 relative to the housing 10, can be installed with a grinding disc, and is configured to drive the grinding disc to grind the workpiece when the output shaft 20 rotates in a high speed. The motor 30 is configured to drive the output shaft 20 to rotate to output the power. The motor 30 may be a series motor. As shown in FIG. 2 and FIG. 3, the motor 30 includes a stator assembly 31, a rotor assembly 32 and a carbon brush 50. The stator assembly 31 includes a stator core 311 and a stator winding 312. The stator core 311 surrounds the rotor assembly 32. The stator winding 312 is wound onto the stator core 311. The rotor assembly 32 includes a rotor core 321, a rotor winding 322, a commutator 40 and a motor shaft 323. The rotor core 321 is arranged around the motor shaft 323. The rotor winding 322 is wound onto the rotor core 321. The commutator 40 is mounted to the motor shaft 323. The motor shaft 323 is rotatable about a first axis 102. When the motor shaft 323 rotates about the first axis 102, the motor 30 outputs the power and drives the output shaft 20 to rotate about the second axial line 101.

As shown in FIG. 3, the commutator 40 is mounted on the motor shaft 323 and rotates in synchronization with the motor shaft 323. A plurality of carbon brushes 50 are arranged around the commutator 40 in a circumferential direction in which the commutator 40 rotates. The carbon brushes 50 are fixed relative to the stator assembly 31, so that the commutator 40 rotating in synchronization with the rotor assembly 32 is rotatable relative to the carbon brushes 50. The carbon brushes 50 are electrically connected to the rotor winding 322 through the commutator 40.

Figure 4:
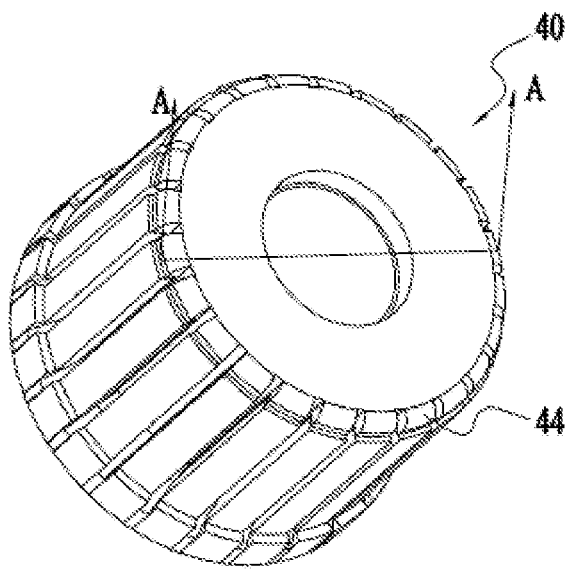
FIG. 4 is a perspective view illustrating a commutator of the motor in FIG. 3.
Figure 5:
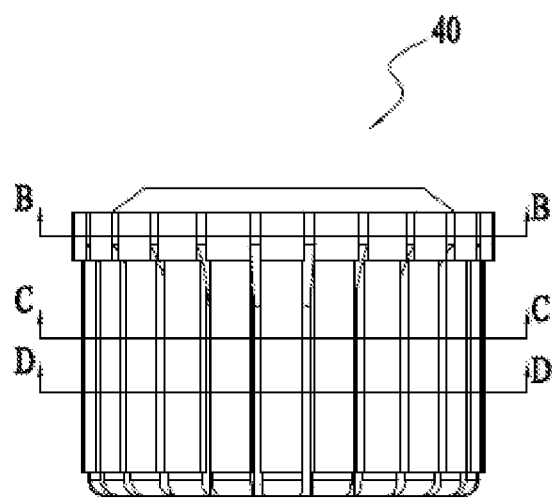
FIG. 5 is a plan view illustrating the commutator of the motor in FIG. 3.
Figure 6:
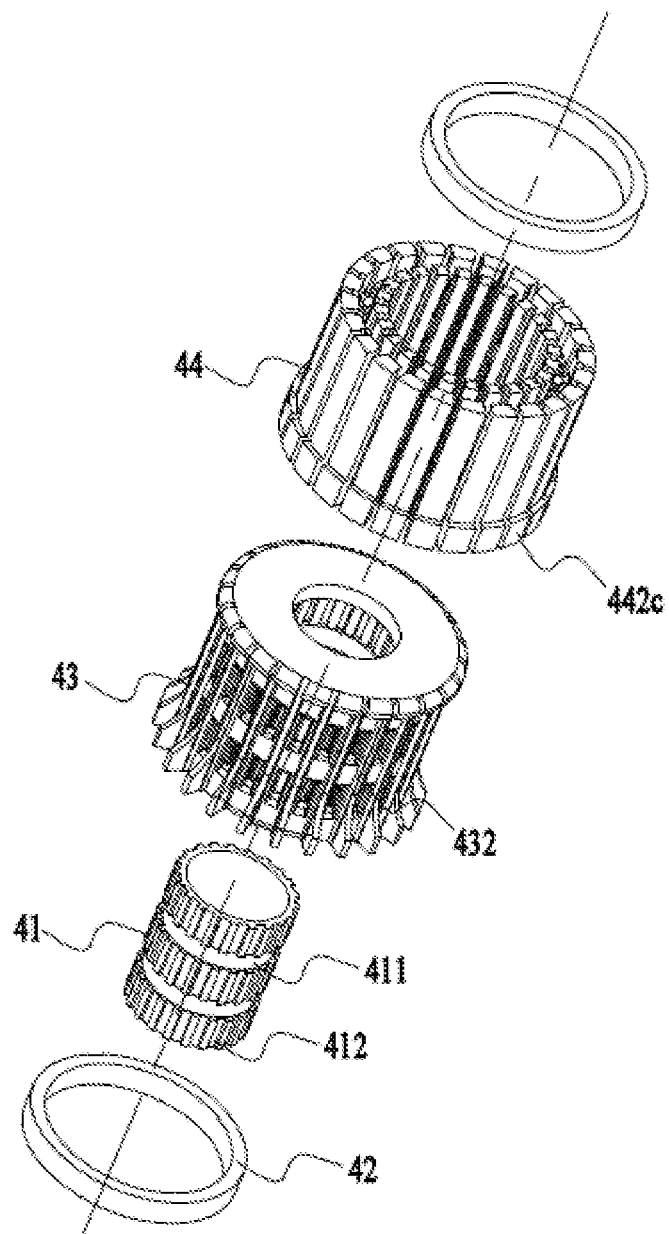
FIG. 6 is an exploded view illustrating the commutator of the motor in FIG. 3.

As shown in FIG. 4 to FIG. 6, the commutator 40 includes a bushing 41, a reinforcing ring 42, an insulating member 43 and a commutator segment 44.

The bushing 41 is arranged around the first axis 102 and centered about the first axis 102. A plurality of commutator segments 44 are provided. The plurality of commutator segments 44 are evenly distributed along a circumference around the first axis 102, and also evenly distributed around the bushing 41. Every two adjacent commutator segments 44 is provided with a gap. Each of the gaps is provided with an insulating material. The insulating materials are formed to constitute the insulating member 43 for supporting the bushing 41, the commutator segments 44 and the reinforcing ring 42. In one hand, the insulating member 43 can be used to fix the positions of the commutator segments 44, and also used to connect the commutator segments 44, the bushing 41 and the reinforcing ring 42 so as to constitute an inseparable whole. On the other hand, a part of the insulating member 43 is arranged between every two adjacent commutator segments 44 so as to realize insulation between the commutator segments 44.

The bushing 41 is a metal member. The bushing 41 is in an interference fit with the motor shaft 323 such that the commutator 40 rotates in synchronization with the motor shaft 323.

As shown in FIG. 6 to FIG. 10, the insulating member 43 is configured to bond the bushing 41, the plurality of commutator segments 44 and the reinforcing ring 42 so as to constitute a whole. The insulating member 43 includes a first insulating layer 431. The first insulating layer 431 is a ring shaped insulating layer. The first insulating layer 431 is arranged between the commutator segments 44 and the bushing 41, namely, the first insulating layer 431 is arranged around the bushing 41, so that the bushing 41 is insulated from the commutator segments 44. In condition that the first insulating layer 431 is directly connected to the motor shaft 323, the insulating member 43 is subjected to an unbalanced stress. However, the bushing 41 is connected to the motor shaft 323, and is a metal member, so that the bushing 41 is subjected to a balanced stress. An outer wall of the bushing 41 is further formed with a ring shaped groove 411 and a linear type groove 412. The ring shaped groove 411 is arranged around the first axis 102, and the linear type groove 412 extends along a direction parallel to the first axis 102. An inner wall of the first insulating layer 431 is embedded into the ring shaped groove 411, and also embedded into the linear type groove 412, so as to improve a binding force of the insulating member 43 and the bushing 41 and avoid a failure of the commutator 40 at a high speed.

The commutator segments 44 are sequentially arranged at intervals in a circumferential direction around the first axis 102. The insulating member 43 includes a spacing portion 432 embedded into a gap between every two adjacent commutator segments 44. The spacing portion 432 can keep a spacing between every two adjacent commutator segments 44 substantially constant, and also achieve insulation between every two adjacent commutator segments 44.

The commutator segment 44 includes a bonding portion 441, a contact portion 442 and a connecting portion. Two connecting portions are provided. The two connecting portions are a first connecting portion 443a and a second connecting portion 443b respectively. The first connecting portion 443a and the second connecting portion 443b are configured to connect the bonding portion 441 and the contact portion 442.

The bonding portion 441 is configured to bond the commutator segment 44 to the insulating member 43. The bonding portion 441 is contiguous uninterrupted in a direction of the first axis 102, namely, the bonding portion 441 is not provided with a spacing that causes breaking of the bonding portion 441 in the direction of the first axis 102. The contact portion 442 is configured to enable the commutator 40 to contact with the carbon brush 50, thereby realizing commutation. The carbon brush 50 is arranged on an outer surface of the contact portion 442 and in contact with the outer surface of the contact portion 442. In a radial direction perpendicular to the first axis 102, the bonding portion 441 is arranged on an inner side of the contact portion 442. In the radial direction perpendicular to the first axis 102, the bonding portion 441 and the contact portion 442 are arranged at intervals.

As shown in FIG. 7 to FIG. 12, the bonding portion 441 is provided with a first end 441a and a second end 441b along a direction of the first axis 102. A portion between the first end 441a and the second end 441b is continuous, namely, the bonding portion 441 is not provided with a spacing that causes the first end 441a and the second end 441b being spaced apart in the direction of the first axis 102. The contact portion 442 is provided with a third end 442a and a fourth end 442b along the direction of the first axis 102. A portion between the third end 442a and the fourth end 442b are continuous, namely, the contact portion 442 is not provided with a spacing that causes the third end 442a and the fourth end 442b being spaced apart in the direction of the first axis 102.

A difference between a length of the bonding portion 441 along the direction of the first axis 102 and a length of the contact portion 442 along the direction of the first axis 102 is greater than or equal to 0 mm, and less than 2 mm. Namely, a difference between a distance L1 between the first end 441a and the second end 441b and a distance L2 between the third end 442a and the fourth end 442b is greater than or equal to 0 mm, and less than 2 mm. In one hand, the length of the bonding portion 441 can be increased, thereby increasing a contact area between the bonding portion 441 and the insulating member 43, and improving a bonding force between the bonding portion 441 and the insulating member 43 and a bonding force between the reinforcing ring 42 and the insulating member 43, and further avoiding a situation that positions of the commutator segments 44 in the radial direction is changed when the commutator 40 rotates at a high speed along with the motor 30, and further prolonging service life of the commutator segment 44 and allowing the motor 30 to rotate at a high speed so as to increase a maximum rotating speed of the motor 30. Eventually, the power tool can output a higher rotating speed, working efficiency can be improved, and the performance of the power tool can be better. In another hand, the length of the bonding portion 441 along the direction of the first axis 102 is sufficiently long, such that a region the width of which along the direction of the first axis 102 is sufficiently wide is formed between the bonding portion 441 and the contact portion 442. The region may be used to place the reinforcing ring 42. The reinforcing ring 42 does not protrude out of the bonding portion 441 and the contact portion 442 in the direction of the first axis 102, thereby preventing the reinforcing ring 42 from being disengaged from the commutator segments 44 along the direction of the first axis 102. In addition, the contact area between the reinforcing ring 42 and the bonding portion 441 is also increased, thereby improving the limiting function upon the commutator segments 44, and preventing the commutator segments 44 from flying out due to a centrifugal force when the commutator 40 rotates at a high speed along with the motor 30.

In the present example, all lengths, sizes, and the like allow for the presence of tolerances. For example, in the present example, a tolerance is 0.05 mm, and the distance between the first end 441a and the second end 441b is L1. Then, because of the tolerance, an actual measured distance between the first end 441a and the second end 441b is L1+0.05 mm, which is also considered that the distance between the first end 441a and the second end 441b is L1. At the same time, an actual measured distance between the first end 441a and the second end 441b is L1−0.05 mm, which is also considered that the distance between the first end 441a and the second end 441b is L1. For other dimensions, the distance L2 between the third end 442a and the fourth end 442b, a dimension of an accommodating hole along the direction parallel to the first axis, a dimension of a first supporting surface along the direction parallel to the first axis, and the like also allow for the presence of tolerances.

The difference between the length of the bonding portion 441 along the direction of the first axis 102 and the length of the contact portion 442 along the direction of the first axis 102 may also be greater than or equal to 0 mm, and less than or equal to 1.5 mm. The difference between the length of the bonding portion 441 along the direction of the first axis 102 and the length of the contact portion 442 along the direction of the first axis 102 may also be greater than or equal to 0 mm, and less than or equal to 1 mm. The difference between the length of the bonding portion 441 along the direction of the first axis 102 and the length of the contact portion 442 along the direction of the first axis 102 may also be greater than or equal to 0 mm, and less than or equal to 0.5 mm. In one example, the difference between the length of the bonding portion 441 along the direction of the first axis 102 and the length of the contact portion 442 along the direction of the first axis 102 is equal to 0 mm. Namely, the length of the bonding portion 441 along the direction of the first axis 102 is substantially the same as the length of the contact portion 442 along the direction of the first axis 102. Or to say, the first end 441a is aligned with the third end 442a, the second end 441b is aligned with the fourth end 442b. In one hand, the length of the bonding portion 441 can be increased, thereby increasing the contact area between the bonding portion 441 and the insulating member 43, and improving the bonding force between the bonding portion 441 and the insulating member 43, and further avoiding a situation that positions of the commutator segments 44 in the radial direction is changed when the commutator 40 rotates at a high speed along with the motor 30, and further prolonging service life of the commutator segments 44 and allowing the motor 30 to rotate at a high speed so as to increase the maximum rotating speed of the motor 30. Eventually, the power tool can output a higher rotating speed, the working efficiency can be improved, and the performance of the power tool can be better. In another hand, the length of the bonding portion 441 along the direction of the first axis 102 is sufficiently long, such that a region the width of which along the direction of the first axis 102 is sufficiently wide is formed between the bonding portion 441 and the contact portion 442. The region may be used to place the reinforcing ring 42. The reinforcing ring 42 does not protrude out of the bonding portion 441 and the contact portion 442 in the direction of the first axis 102, thereby preventing the reinforcing ring 42 from being disengaged from the commutator segment 44 along the direction of the first axis 102. In addition, the contact area between the reinforcing ring 42 and the bonding portion 441 is also increased, thereby improving the limiting function upon the commutator segments 44, and preventing the commutator segment 44 from flying out due to a centrifugal force when the commutator 40 rotates at a high speed along with the motor 30.

The length of the bonding portion 441 along the direction of the first axis 102 is greater than or equal to 10 mm, and less than or equal to 20. In one example, the length of the bonding portion 441 along the direction of the first axis 102 is greater than or equal to 12 mm, and less than or equal to 20 mm.

The bonding portion 441 extends along a direction of a first straight line 103. The contact portion 442 extends along a direction of a second straight line 104. The first straight line 103 and the second straight line 104 are parallel to each other, and the first straight line 103 and the first axis 102 are parallel to each other. In the radial direction perpendicular to the first axis 102, the bonding portion 441 and the contact portion 442 are spaced apart by a certain distance. The first connecting portion 443a and the second connecting portion 443b are connected to the bonding portion 441 and the contact portion 442 so that the bonding portion 441 and the contact portion 442 constitute a whole. In the present example, the bonding portion 441, the contact portion 442, the first connecting portion 443a and the second connecting portion 443b are integrally formed.

The contact portion 442 is an L-shaped structure. Thus, the commutator 40 may be a slot type commutator, or may be a hook type commutator. In other words, the fourth end 442b of the contact portion 442 is formed with a conductive portion 442c for connecting with the rotor winding 322.

Figure 7:
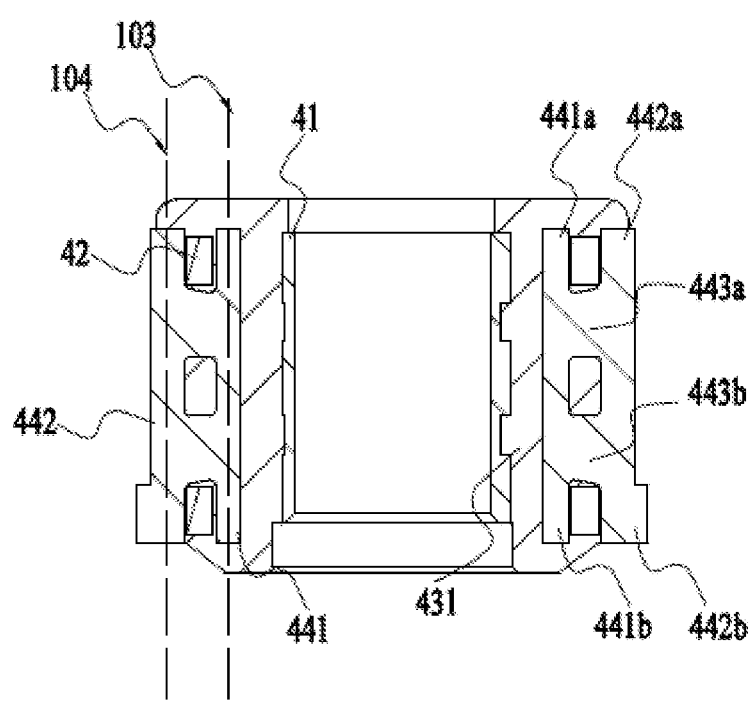
FIG. 7 is a section view illustrating the commutator of the motor in FIG. 4 along an A-A line.
Figure 8:
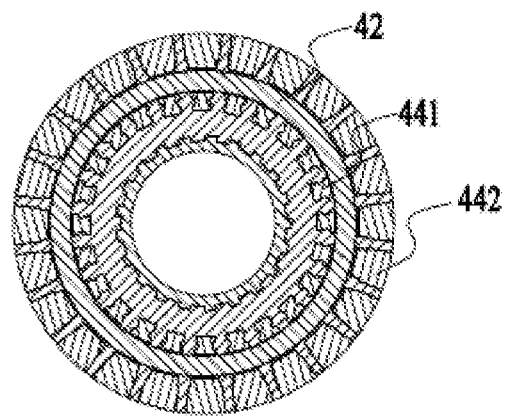
FIG. 8 is a section view illustrating the commutator of the motor in FIG. 4 along a B-B line.
Figure 9:
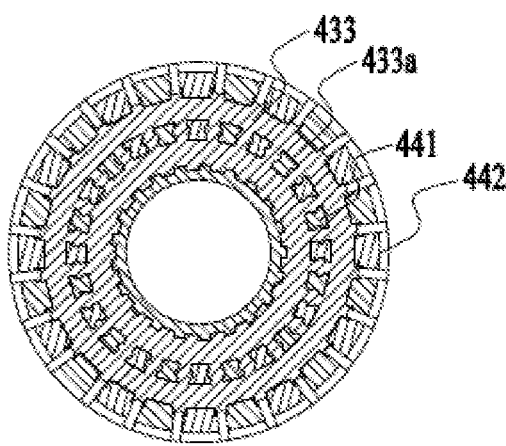
FIG. 9 is a section view illustrating the commutator of the motor in FIG. 4 along a C-C line.
Figure 10:
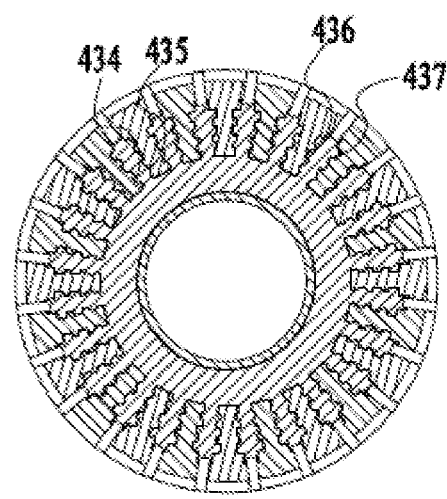
FIG. 10 is a section view illustrating the commutator of the motor in FIG. 4 along a D-D line.
Figure 11:
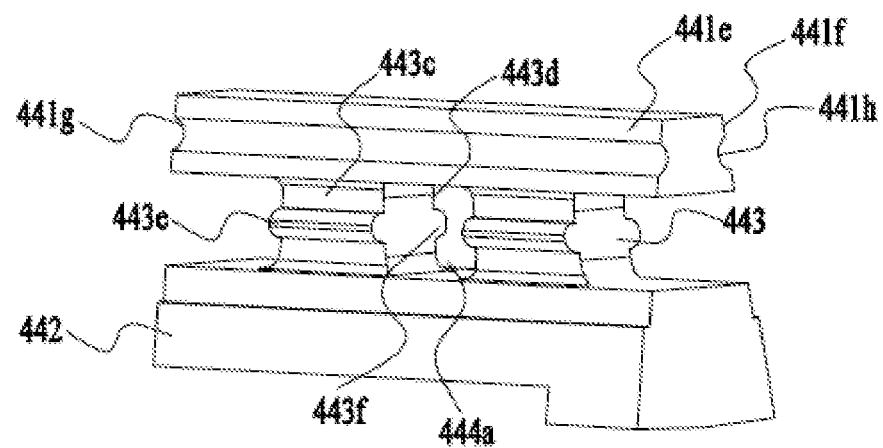
FIG. 11 is a perspective view illustrating a commutator bar of the commutator in FIG. 6.
Figure 12:
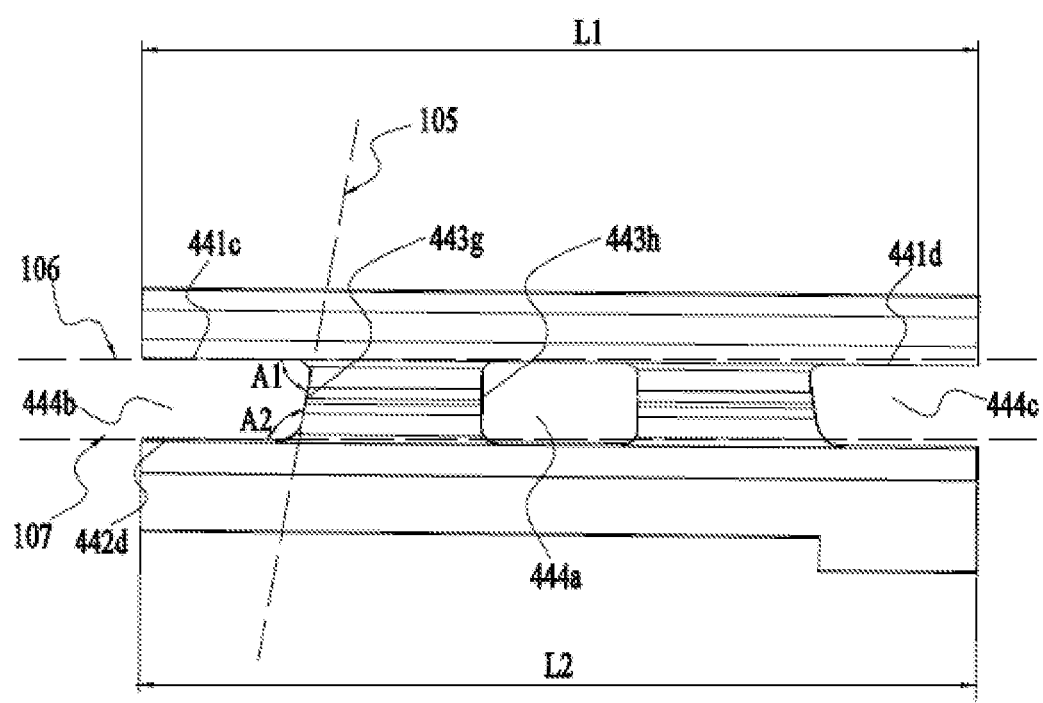
FIG. 12 is a plan view illustrating the commutator bar in FIG. 11.

The first connecting portion 443a and the second connecting portion 443b are connected to the bonding portion 441 and the contact portion 442 respectively. The first connecting portion 443a and the second connecting portion 443b are spaced apart by a certain distance to form an accommodating hole 444a capable of accommodating a part of the insulating member 43. As shown in FIG. 7 and FIG. 9, a part of the insulating member 43 embedded into the accommodating hole 444a is distributed in the circumferential direction around the first axis 102. The insulating member 43 includes a ring shaped portion 433. The ring shaped portion 433 includes an embedded portion 433a embedded into the accommodating hole 444a and a portion arranged between every two adjacent accommodating holes 444a. Thus, on one hand, the embedded portion 433a of the ring shaped portion 433 embedded into the accommodating hole 444a can play a role of increasing the contact area between the insulating member 43 and the commutator segments 44, thereby improving the bonding force between the commutator segment 44 and the insulating member 43. On the other hand, the ring shaped portion 433 is a collar around the commutator segments 44, and can further limit the positions of the commutator segments 44 in the radial direction, thereby preventing the commutator segments 44 from being disengaged from the insulating member 43 in the radial direction, and reducing positional bounce of the commutator segments 44 in the radial direction when the motor 30 rotates at a high speed.

In the present example, the length of the bonding portion 441 along the direction of the first axis 102 is substantially the same as the length of the contact portion 442 along the direction of the first axis 102, so that the length of the bonding portion 441 is sufficiently long, and consequently the first connecting portion 443a is more adjacent to the first end 441a of the bonding portion 441 and the second connecting portion 443b is more adjacent to the second end 441b of the bonding portion 441, and consequently a length of the accommodating hole 444a along the direction of the first axis 102 is further increased. The length of the accommodating hole 444a along the direction of the first axis 102 is greater than 2.6 mm, and less than or equal to 3.5 mm. In one example, the length of the accommodating hole 444a along the direction of the first axis 102 is greater than or equal to 2.8 mm, and less than or equal to 3.3 mm. A ratio of the length of the accommodating hole 444a along the direction of the first axis 102 to the length of the contact portion 442 along the direction of the first axis 102 is greater than or equal to 0.17, and less than or equal to 0.22. In this way, the length of the accommodating hole 444a along the direction of the first axis 102 is increased, thereby improving the bonding force between the commutator segments 44 and the insulating member 43, and further reducing the positional bounce of the commutator segments 44 in the radial direction when the motor 30 rotates at a high speed, and further effectively reducing deformation of the commutator segments 44.

A first accommodating groove 444b and a second accommodating groove 444c are formed between the bonding portion 441 and the contact portion 442. The first accommodating groove 444b is arranged on one side of the first connecting portion 443a facing away from the accommodating hole 444a, and the second accommodating groove 444c is arranged on one side of the second connecting portion 443b facing away from the accommodating hole 444a. The first connecting portion 443a is located between the first accommodating groove 444b and the accommodating hole 444a, and the second connecting portion 443b is located between the second accommodating groove 444c and the accommodating hole 444a. The first accommodating groove 444b is opened toward a direction facing away from the first connecting portion 443a and along the direction parallel to first axis 102, and the second accommodating groove 444c is opened toward a direction facing away from the second connecting portion 443b and along the direction parallel to first axis 102. Two reinforcing rings 42 are provided. One of the two reinforcing rings 42 is arranged inside the first accommodating groove 444b and another of the two reinforcing rings 42 is arranged inside the second accommodating groove 444c, so that the reinforcing rings 42 can be centered on the first axis 102 and surround the bonding portion 441. The length of the bonding portion 441 along the direction of the first straight line 103 is sufficiently long, so that a length of the first accommodating groove 444b along the direction of the first axis 102 is increased and a length of the second accommodating groove 444c along the direction of the first axis 102 is increased. Thus, enough space is provided to place the reinforcing rings 42, and the contact area between the reinforcing rings 42 and the bonding portion 441 is increased. The bonding portion 441 includes a first supporting surface 441c and a second supporting surface 441d for supporting the reinforcing rings 42.

The first supporting surface 441c is arranged on one side of the first connecting portion 443a facing away from the second connecting portion 443b, and the second supporting surface 441d is arranged on one side of the second connecting portion 443b facing away from the first connecting portion 443a. A length of the first supporting surface 441c along the direction of the first axis 102 is greater than or equal to 2 mm, and less than or equal to 4 mm, and a length of the second supporting surface 441d along the direction of the first axis 102 is greater than or equal to 2 mm, and less than or equal to 4 mm. In some examples, the length of the first supporting surface 441c along the direction of the first axis 102 is greater than or equal to 2.5 mm, and less than or equal to 3.5 mm, and the length of the second supporting surface 441d along the direction of the first axis 102 is greater than or equal to 2.5 mm and less than or equal to 3.5 mm. In this way, the first supporting surface 441c and the second supporting surface 441d are sufficiently large in length, which can realize reliable contact between the first and second supporting surfaces and the reinforcing rings 42, and further improve the limiting function of the reinforcing rings 42 upon the commutator segments 44.

Two side walls of the bonding portion 441 in the circumferential direction around the first axis 102 are a first side wall 441e and a second side wall 441f respectively. The first side wall 441e is provided with a first recess 441g recessed towards the second side wall 441f, and the second side wall 441f is provided with a second 441h recessed towards the first side wall 441e. The first recess 441g extends to the second end 441b from the first end 441a. The second recess 441h extends to the second end 441b from the first end 441a. In this way, a part of the insulating member 43 is embedded into the first recess 441g and the second recess 441h. In one example, the insulating member 43 includes a first protrusion 434 embedded into the first recess 441g and a second protrusion 435 embedded into the second recess 441h. By the contact of the first recess 441g and the first protrusion 434 and the contact of the second recess 441h and the second protrusion 435, the contact area between the bonding portion 441 and the insulating member 43 is further increased, thereby increasing the bonding force between the commutator segments 44 and the insulating member 43. In addition, the first protrusion 434 and the second protrusion 435 are both embedded into the bonding portion 441. In this way, the first protrusion 434 can radially generate a stop force for stopping the bonding portion 411 from being radially away from the first axis 102, and the second protrusion 435 can radially generate a stop force for stopping the bonding portion 441 from being radially away from the first axis 102. The first recess 441g is an arc shaped groove, and the second recess 441h is also an arc shaped groove.

Two side walls of the first connecting portion 443a in the circumferential direction around the first axis 102 is a third side wall 443c and a fourth side wall 443d. The third side wall 443c is provided with a third protrusion 443e, and the fourth side wall 443d is provided with a fourth protrusion 443f In this way, a part of the insulating member 43 is embedded into a region between the third protrusion 443e and the bonding portion 441, and the insulating member 43 may also be embedded into a region between the third protrusion 443e and the contact portion. Similarly, the insulating member 43 may also be embedded into a region between the fourth protrusion 443f and the bonding portion 441, and may also be embedded into a region between the fourth protrusion 443f and the contact portion. In one example, the insulating member 43 includes a third recess 436 allowing the third protrusion 443e to embed into, and a fourth recess 437 allowing the fourth protrusion 443f to embed into. By the contact of the third protrusion 443e and the third recess 436 and the contact of the fourth protrusion 443f and the fourth recess 437, the contact area between the bonding portion 441 and the insulating member 43 is further increased, thereby increasing the bonding force between the commutator segments 44 and the insulating member 43. The first connecting portion 443a and the second connecting portion 443b are symmetrically arranged about a plane perpendicular to the first axis 102.

The first connecting portion 443a includes a first connecting surface 443g and a second surface 443h. The first connecting surface 443g also forms a groove bottom of the first accommodating groove 444b, and the second connecting surface 443h forms a hole wall of the accommodating hole 444a. The first connecting surface 443g substantially extends along a first plane 105. The first plane 105 and the first axis 102 are obliquely intersected. The second connecting surface 443h is substantially perpendicular to the first axis 102. The first supporting surface 441c of the bonding portion 441 extends in a second plane 106. An angle A1 formed by intersection of the second plane 106 and the first plane 105 is greater than or equal to 75 degrees, and less than or equal to 85 degrees. In one example, the angle A1 formed by the intersection of the second plane 106 and the first plane 105 is 80 degrees. The contact portion 442 is formed with a third supporting surface 442d for supporting the reinforcing ring 42. The third supporting surface 442d extends in a third plane 107. An angle A2 formed by intersection of the third plane 107 and the first plane 105 is greater than or equal to 105 degrees, and less than or equal to 115 degrees. In one example, the angle A2 formed by the intersection of the third plane 107 and the first plane 105 is 100 degrees. In this way, the bonding force between the insulating member 43 and the commutator segments 44 can be increased, and the bonding force can have a component force along the first axis 102 direction, thereby effectively reduce the bounce or deformation of the commutator segments 44 along the direction of the first axis 102. The first connecting surface 443g may be a circular arc surface, and the second connecting surface 443h may also be a circular arc surface.

The third protrusion 443e extends to the second connecting surface 443h from the first connecting surface 443g, and the fourth protrusion 443f also extends to the second connecting surface 443h from the first connecting surface 443g.

In addition, simulation and testing are performed on a model of a commutator segment of the present example and models of some exiting commutator segment samples, and comparison is performed and shows that the commutator segment of the present example is better in performance. The details are as follows.

TABLE 1

| Model | The fourth end | | The third end | |
|---|---|---|---|---|
| | Peak stress (MPA) | Total deformation (um) | Peak stress (MPA) | Deformation (um) |
| Model I | 164.7 | 7.7235 | 115.6 | 5.0018 |
| Model II | 139.3 | 5.2635 | 95.8 | 3.5003 |
| Model III | 124.1 | 4.6524 | 84.3 | 3.0731 |
| Model IV | 99.6 | 3.9027 | 72.4 | 2.6463 |

In the above table 1, a peak stress and a total deformation of a third end of a contact portion of the model of the commutator segment are stimulated and measured, and a peak stress and a total deformation of a fourth end of a contact portion is also stimulated and measured. A length of a bonding portion of a commutator segment of model I is less than a length of a contact portion. The bonding portion is not provided with a first recess and a second recess, and a connecting portion is not provided with a third protrusion and a fourth protrusion. A commutator segment of model II is improved on the basis of the commutator segment of model I. The bonding portion is provided with a first recess and a second recess, and the connecting portion is provided with a third protrusion and a fourth protrusion. A commutator segment of model III is further improved on the basis of the commutator segment of model II, and a first connecting surface of a connecting portion extends in a first plane obliquely intersected with a first axis. A commutator segment of model IV is further improved on the basis of the commutator segment of model III, and a length of a bonding portion along a first axis direction is increased, so that the length of the bonding portion is substantially the same as a length of a contact portion. Compared to the commutator segment of model I, the commutator segment of model II adds the first recess and the second recess, and adds the third protrusion and the fourth protrusion. It can be clearly seen from the simulation result that a peak stress of model II is much lower than a peak stress of model I, and a total deformation of model II is also much lower than a total deformation of model I. Compared to the commutator segment of model III, the commutator segment of model IV increases the length of the bonding portion so that the length of the bonding portion is substantially the same as the length of the contact portion. It can be clearly seen from the stimulation result that a peak stress of model IV is much lower than a peak stress of model III, and a total deformation of model IV is also much lower than a total deformation of model III. In addition, it can be clearly seen from the stimulation result that, in condition that the first connecting surface is obliquely arranged relative to the first axis and a length of an accommodating hole is increased, performance of the commutator segment can also be improved and the deformation of the commutator segment can be reduced.

TABLE 2

| Sample | Testing item | Testing I | Testing II | Testing III | Testing IV | Testing V | AVG |
|---|---|---|---|---|---|---|---|
| Sample I | Deviation between commutator segments (um) | 2.07 | 2.15 | 2.79 | 2.7 | 2.55 | 2.452 |
| | Radial change (um) | 4.12 | 5.22 | 4.82 | 5.18 | 2.86 | 4.44 |
| Sample II | Deviation between commutator segments (um) | 2.12 | 1.65 | 1.33 | 1.62 | 1.33 | 1.61 |
| | Radial change (um) | 4.43 | 2.64 | 1.53 | 1.63 | 2.78 | 2.602 |

In the above table 2, a deviation between commutator segments when a commutator rotates at a high temperature and a high speed and radial bounce of the commutator are tested. The deviation between commutator segments is as follows. Two adjacent commutator segments are a first commutator segment and a second commutator segment respectively. A positional change amount of the first commutator segment along a radial direction perpendicular to a first axis during the rotation at the high speed is a first change amount. A positional change amount of the second commutator segment along a radial direction perpendicular to the first axis during the rotation at the high speed is a second change amount. A difference between the first change amount and the second change amount is a deviation between commutator segments of the first and second commutator segments. A maximum deviation between commutator segments of all commutator segments is a maximum deviation between commutator segments of commutator. A radial change refers to a change amount of a commutator segment along a radial direction perpendicular to the first axis during the rotation at the high speed. Sample I is a commutator in the related art. A length of a bonding portion of the commutator segment is less than a length of a contact portion, and the bonding portion is not provided with a recess, and a connecting portion is not provided with a protrusion. Sample II is a commutator of the present example. It can be seen from the testing result in table 2 that, a deviation between commutator segments of the commutator of sample I is 2.452; and a deviation between commutator segments of the commutator of the present example is 1.61. Compared to the deviation between commutator segments of the commutator in the related art, the deviation between commutator segments of the commutator of the present example is reduced by 34.34%. A radial change of the commutator of sample I is 4.44, and a radial change of the commutator of the present example is 2.602. Compared to the radial change of the commutator in the related art, the radial change of the commutator of the present example is reduced by 41.40%. It can be seen from the above comparison that the commutator of the present example is relatively small in the positional change of the commutator bar in the radial direction when the motor rotates at a high speed, thereby improving the service life of the commutator and allowing the motor to rotate at a high speed for a long time, and further improving the output performance of the power tool.

The basic principles, main features and advantages of the present disclosure have been shown and described above. It is to be understood by any person skilled in the art that the foregoing examples are not intended to limit the present disclosure in any form. All technical solutions obtained by equivalent substitution or equivalent transformation are within the scope of the following claims.

What is claimed is:

1. An angle grinder, comprising:
   a housing;
   an output shaft at least partially extending out of the housing; and
   a motor configured to drive the output shaft;
   wherein the motor comprises:
   a stator assembly;
   a rotor assembly comprising a motor shaft configured to rotate about a first axis for driving the output shaft;
   a commutator connected to the motor shaft; and
   a carbon brush in contact with the commutator;
   wherein the commutator comprises:
   a bushing configured to connect the commutator to the motor shaft;
   a plurality of commutator segments sequentially distributed in a circumferential direction around the first axis and arranged around the bushing; and
   an insulating member configured to bond the bushing and the plurality of commutator segments so as to constitute a whole;
   wherein each of the commutator segments comprises:
   a contact portion configured to contact the carbon brush;
   a bonding portion configured to bond a respective commutator segment to the insulating member; and
   a connecting portion configured to connect the contact portion with the bonding portion;
   wherein the contact portion and the bonding portion are arranged at intervals in a radial direction perpendicular to the first axis; a difference between a length of the contact portion along a direction parallel to the first axis and a length of the bonding portion in a direction parallel to the first axis is greater than or equal to 0 mm and less than 2 mm.

2. The angle grinder according to claim 1, wherein the difference between the length of the contact portion along the direction parallel to the first axis and the length of the bonding portion along the direction parallel to the first axis is greater than or equal to 0 mm and less than or equal to 1 mm.

3. The angle grinder according to claim 1, wherein the difference between the length of the contact portion along the direction parallel to the first axis and the length of the bonding portion along the direction parallel to the first axis is greater than or equal to 0 mm and less than or equal to 0.5 mm.

4. The angle grinder according to claim 1, wherein, in the direction parallel to the first axis, the bonding portion comprises a first end and a second end arranged at two ends of the bonding portion, the contact portion comprises a third end and a fourth end arranged at two ends of the contact portion; the first end is aligned with the third end, and the second end is aligned with the fourth end.

5. The angle grinder according to claim 4, wherein the bonding portion is continuous from the first end to the second end and the contact portion is continuous from the third end to the fourth end.

6. The angle grinder according to claim 5, wherein two connecting portions are provided, an accommodating hole is formed between the two connecting portions, and a part of the insulating member is embedded into the accommodating hole.

7. The angle grinder according to claim 6, wherein a length of the accommodating hole along a direction parallel to the first axis is greater than or equal to 2.8 mm and less than or equal to 3.3 mm.

8. The angle grinder according to claim 6, wherein a first accommodating groove and a second accommodating groove are arranged between the bonding portion and the contact portion, the two connecting portions are defined as a first connecting portion and a second connecting portion respectively, the first connecting portion is arranged between the first accommodating groove and the accommodating hole, and the second connecting portion is arranged between the accommodating hole and the second accommodating groove, the commutator further comprises a first reinforcing ring at least a part of which is arranged inside the first accommodating groove and a second reinforcing ring at least part of which is arranged inside the second accommodating groove, the first reinforcing ring surrounds the bonding portion around the first axis, and the second reinforcing ring surrounds the bonding portion around the first axis.

9. The angle grinder according to claim 8, wherein the bonding portion comprises a first supporting surface configured to contact the first reinforcing ring, and a length of the first supporting surface along a direction parallel to the first axis is greater than or equal to 2.5 mm and less than or equal to 3.5 mm.

10. The angle grinder according to claim 9, wherein the first connecting portion comprises a first connecting surface and a second connecting surface, the first connecting surface constitutes a groove bottom of the first accommodating groove, and the second connecting surface constitutes a hole wall of the accommodating hole; the first connecting surface extends in a first plane obliquely intersected with the first axis.

11. The angle grinder according to claim 10, wherein the first supporting surface extends in a second plane, the second plane and the first axis are parallel to each other, and an angle formed by intersection of the second plane and the first plane is greater than or equal to 75 degrees and less than or equal to 85 degrees.

12. The angle grinder according to claim 6, wherein two side walls of the bonding portion in the circumferential direction around the first axis are defined as a first side wall and a second side wall respectively, the first side wall is formed with a first recess recessed towards the second side wall, and the second side wall is formed with a second recess recessed towards the first side wall, a part of the insulating member is embedded into the first recess, and another part of the insulating member is embedded into the second recess.

13. The angle grinder according to claim 1, wherein the bonding portion extends along a first straight line parallel to the first axis, and the contact portion extends along a second straight line parallel to the first axis; the second straight line and the first straight line are parallel to each other.

14. A motor, comprising:
a stator assembly;
a rotor assembly comprising a motor shaft configured to rotate about a first axis;
a commutator connected to the motor shaft; and
a carbon brush in contact with the commutator;
wherein the commutator comprises:
a bushing configured to connect the commutator to the motor shaft;
a plurality of commutator segments sequentially distributed in a circumferential direction around the first axis and arranged around the bushing; and
an insulating member configured to bond the bushing and the plurality of commutator segments so as to constitute a whole;
wherein each of the commutator segments comprises:
a contact portion configured to contact the carbon brush;
a bonding portion configured to bond a respective commutator segment to the insulating member; and
a connecting portion, configured to connect the contact portion with the bonding portion;
wherein the contact portion and the bonding portion are arranged at intervals along a radial direction perpendicular to the first axis; a difference between a length of the contact portion along a direction parallel to the first axis and a length of the bonding portion in a direction parallel to the first axis is greater than or equal to 0 mm, and less than 2 mm.

15. The motor according to claim 14, wherein the difference between the length of the contact portion along the direction parallel to the first axis and the length of the bonding portion along the direction parallel to the first axis is greater than or equal to 0 mm and less than or equal to 0.5 mm.

16. The motor according to claim 14, wherein two side walls of the bonding portion in the circumferential direction around the first axis are defined as a first side wall and a second side wall respectively, the first side wall is formed with a first recess recessed towards the second side wall, and the second side wall is formed with a second recess recessed towards the first side wall, a part of the insulating member is embedded into the first recess, and another part of the insulating member is embedded into the second recess.

17. The motor according to claim 14, wherein the bonding portion extends along a first straight line parallel to the first axis, and the contact portion extends along a second straight line parallel to the first axis; the second straight line and the first straight line are parallel to each other.

18. The motor according to claim 14, wherein, in the direction parallel to the first axis, the bonding portion comprises a first end and a second end arranged at two ends of the bonding portion, the contact portion comprises a third end and a fourth end arranged at two ends of the contact portion; the first end is aligned with the third end, the second end is aligned with the fourth end, the bonding portion is continuous from the first end to the second end, and the contact portion is continuous from the third end to the fourth end.

19. The motor according to claim 18, wherein two connecting portions are provided, an accommodating hole is formed between the two connecting portions, and a part of the insulating member is embedded into the accommodating hole.

20. The motor according to claim 19, wherein the two connecting portions are defined as a first connecting portion and a second connecting portion respectively, two side walls of the first connecting portion in the circumferential direction around the first axis are defined as a three side wall and a four side wall respectively, and both the third side wall and the fourth side wall are provided with protrusions.

* * * * *